US012359025B2

(12) United States Patent
Nielsen et al.

(10) Patent No.: US 12,359,025 B2
(45) Date of Patent: Jul. 15, 2025

(54) POLY(ARYLENE SULFIDE) POLYMERS AND CORRESPONDING POLYMER COMPOSITIONS AND ARTICLES

(71) Applicant: SOLVAY SPECIALTY POLYMERS USA, LLC, Alpharetta, GA (US)

(72) Inventors: Matthew Nielsen, Alpharetta, GA (US); Stéphane Jeol, Saint-Genis-Laval (FR)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 165 days.

(21) Appl. No.: 17/769,576

(22) PCT Filed: Oct. 9, 2020

(86) PCT No.: PCT/EP2020/078357
§ 371 (c)(1),
(2) Date: Apr. 15, 2022

(87) PCT Pub. No.: WO2021/074017
PCT Pub. Date: Apr. 22, 2021

(65) Prior Publication Data
US 2024/0141109 A1 May 2, 2024

(30) Foreign Application Priority Data
Nov. 4, 2019 (EP) .................... 19206825

(51) Int. Cl.
*C08G 75/0254* (2016.01)
*C08K 7/02* (2006.01)
*C08L 81/04* (2006.01)

(52) U.S. Cl.
CPC ............ *C08G 75/0254* (2013.01); *C08K 7/02* (2013.01); *C08L 81/04* (2013.01); C08L 2205/16 (2013.01)

(58) Field of Classification Search
CPC ....... C08G 75/0254; C08K 7/02; C08L 81/04; C08L 2205/16
See application file for complete search history.

(56) References Cited

U.S. PATENT DOCUMENTS

| 3,354,129 | A | 11/1967 | Edmonds, Jr. et al. |
| 4,837,294 | A | 6/1989 | Ichikawa et al. |
| 5,093,468 | A | 3/1992 | Kohler |
| 5,869,599 | A | 2/1999 | Hay et al. |
| 6,365,071 | B1 | 4/2002 | Jenewein et al. |
| 2002/0192564 | A1 | 12/2002 | Ota et al. |
| 2010/0035162 | A1 | 2/2010 | Chiga et al. |
| 2010/0062344 | A1 | 3/2010 | Koh et al. |
| 2013/0266847 | A1 | 10/2013 | Noguchi et al. |
| 2014/0017572 | A1 | 1/2014 | Uehara et al. |
| 2015/0175748 | A1 | 6/2015 | Fodor et al. |
| 2016/0043441 | A1 | 2/2016 | Chiga |
| 2016/0068636 | A1 | 3/2016 | Suzuki et al. |
| 2016/0181660 | A1 | 6/2016 | Dubois |
| 2016/0181661 | A1 | 6/2016 | Dubois et al. |
| 2016/0308252 | A1 | 10/2016 | Iriyama et al. |
| 2017/0092979 | A1 | 3/2017 | Chiga et al. |
| 2017/0250445 | A1 | 8/2017 | Burkhardt et al. |
| 2017/0317380 | A1 | 11/2017 | Takijiri et al. |
| 2017/0324117 | A1 | 11/2017 | Morisawa et al. |
| 2018/0183105 | A1 | 6/2018 | Asano et al. |
| 2018/0277900 | A1 | 9/2018 | Abe et al. |
| 2019/0058221 | A1 | 2/2019 | Burkhardt et al. |
| 2020/0339755 | A1 | 10/2020 | Miyabara et al. |

FOREIGN PATENT DOCUMENTS

| DE | 3942416 A1 | 3/1991 |
| EP | 1291679 A1 | 3/2003 |
| JP | S6198526 A | 5/1986 |
| JP | S63275642 A | 11/1988 |
| JP | 2505454 B2 | 6/1996 |
| JP | 2008135273 A | 6/2008 |
| JP | 2008257988 A | 10/2008 |
| JP | 2012082339 A | 4/2012 |
| JP | 2013045590 A | 3/2013 |
| JP | 2014110122 A | 6/2014 |
| JP | 2018092785 A | 6/2018 |
| JP | 2018101612 A | 6/2018 |
| KR | 20180119735 A | 11/2018 |
| WO | 9011316 A1 | 10/1990 |
| WO | 09040367 A1 | 4/2009 |

(Continued)

OTHER PUBLICATIONS

International Search Report issued in International Application No. PCT/EP2020/078357, mailed Nov. 3, 2020 (4 pages).
Written Opinion issued in International Application No. PCT/EP2020/078357, mailed Nov. 3, 2020 (5 pages).
Myung-Jin Chun et al., Bicontinuous structured silicon anode exhibiting stable cycling performance at elevated temperature, RSC Adv., 2013, 3, 21320-21325 (6 pages).
Murphy J., in "Additives for Plastics Handbook", 2nd Edition, 2001, Chapter 5.2.3., p. 43-48—Elsevier Advanced Technology (8 pages).
ASTM D256-10, "Standard Test Methods for Determining the Izod Pendulum Impact Resistance of Plastics", 2018, p. 1-20 (20 pages).
Janhsen B. et al., "Intra-versus intermolecular electron transfer in radical nucleophilic aromatic substitution of dihalo (hetero)arenes - a tool for estimating ?-conjugaison in aromatic systems", Chem. Sci., 2017, 8, p. 3547-3553, Royal Society of Chemistry (7 pages).

*Primary Examiner* — Shane Fang
(74) *Attorney, Agent, or Firm* — Osha Bergman Watanabe & Burton LLP

(57) ABSTRACT

Described herein are poly(arylene sulfide) ("PAS") polymers (PASP) including recurring units formed from a dihalocarbazole containing monomer. It was surprisingly found that such monomers could be incorporated into PAS polymers at desirable concentrations to provide improved amine content. Additionally, it was surprisingly found that, relative to PAS homopolymers and PAS polymers incorporating recurring units with primary amines, the PAS polymers (PASP) described herein and increased glass transition temperatures ("$T_g$"). The PAS polymers (PASP), and PAS polymer compositions, can be desirably incorporated into wide variety of articles including, but not limited to, automotive articles and oil and gas articles.

18 Claims, No Drawings

(56) References Cited

FOREIGN PATENT DOCUMENTS

| | | |
|---|---|---|
| WO | 2012078770 A2 | 6/2012 |
| WO | 13033579 A1 | 3/2013 |
| WO | 2019151288 A1 | 8/2019 |
| WO | 2019211353 A1 | 11/2019 |

POLY(ARYLENE SULFIDE) POLYMERS AND CORRESPONDING POLYMER COMPOSITIONS AND ARTICLES

CROSS REFERENCE TO RELATED APPLICATIONS

This application is a national stage entry under 35 U.S.C. § 371 of International Application No. PCT/EP2020/078357 filed 9 Oct. 2020, which claims priority to U.S. provisional patent application No. 62/915,155, filed on 15 Oct. 2019, and European patent application no. 19206825.2, filed on 4 Nov. 2019. The entire contents of these applications are explicitly incorporated herein by this reference.

FIELD OF THE INVENTION

The invention relates to poly(arylene sulfide) ("PAS") polymers having an outstanding thermal properties and mechanical properties. The invention also relates to PAS polymer compositions, methods of making PAS polymers and PAS compositions and articles incorporating the PAS polymer and PAS polymer compositions.

BACKGROUND OF THE INVENTION

Poly(arylene sulfide) ("PAS") polymers having pendant amines are desirable at least because the amine can react with many types of functional groups including, but not limited to, carboxylic acids, carboxylates, anhydrides, epoxides, urethanes, amides, ketones, isocyanates, urea, halogens, activated ethers, esters, and acid chlorides. The ability of the pendant amines to react with a wide variety of functional groups increases the compatibility between PAS polymers and other polymers in PAS polymer blends, relative to analogous PAS polymers free of pendant amine groups.

SUMMARY OF INVENTION

In a first aspect, the invention relates to a poly(arylene sulfide) ("PAS") polymer (PASP) comprising recurring units $R_{PAS1}$ and $R_{PAS2}$, represented by the following formulae, respectively:

  (1)

  (2)

wherein
—$Ar_1$— is selected from the group of formulae consisting of:

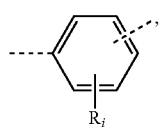  (3)

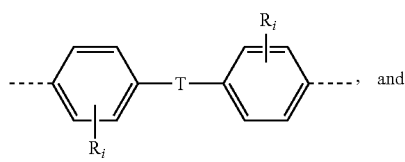  (4)

, and

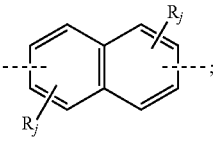  (5)

—$Ar_2$— is represented by the following formula:

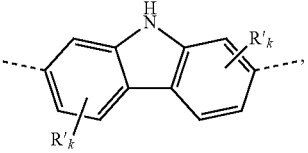  (6)

R and R', at each instance, is independently selected from the group consisting of a $C_1$-$C_{12}$ alkyl group, a $C_7$-$C_{24}$ alkylaryl group, a $C_7$-$C_{24}$ aralkyl group, a $C_6$-$C_{24}$ arylene group, and a $C_6$-$C_{18}$ aryloxy group;

T is selected from the group consisting of a bond, —CO—, —$SO_2$—, —O—, —$C(CH_3)_2$, phenyl and —$CH_2$—;

i, at each instance, is an independently selected integer from 0 to 4; and j and k, at each instance, are an independently selected integer from 0 to 3;

In some embodiments, the PAS polymer (PASP) comprises a $T_g$ of at least 95° C. Additionally or alternatively, in some embodiments, the PAS polymer (PASP) comprises a $T_m$ of at least 200° C. In still further additional or alternative embodiments, the PAS polymer (PASP) comprises an impact strength at least 30 J/g, as determined according to ASTM D256.

In a second aspect, the invention relates to a polymer composition (PC) comprising the PAS polymer (PASP) and an additional polymer comprising a functional group selected from the group consisting of a carboxylic acid, a carboxylate, an anhydride, an epoxide, a urethane, an amide, a ketone, an isocyanate, a urea, a halogen, an activated ether, an ester, and an acid chloride. In some embodiments, the additional polymer is a is a thermoplastic polymer. In some embodiments, the additional polymer is a is a thermoset polymer or thermoset precursor. In some embodiments, additionally or alternatively, the polymer composition (PC) comprises a fibrous reinforcing filler or a toughener, preferably a fibrous reinforcing filler.

In a further aspect, the invention relates to an automotive component, an aerospace component, or oil and gas component comprising the PAS polymer (PASP) or the polymer composition (PC).

In still a further aspect, the invention relates to a method of making the PAS polymer (PASP), the method comprising reacting in a reaction mixture a dihaloaromatic compound having the following formula: $X_1$—$Ar_1$—$X_2$; a dihalocarbazole containing monomer having the following formula: $X_3$—$Ar_2$—$X_4$; and a sulfur compound, wherein $X_1$ to $X_4$ are independently selected halogens, and the sulfur compound is selected from the group consisting of thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, and hydrogen sulfide; preferably the sulfur compound is an alkali metal sulfide; most preferably the sulfur compound is Na$_2$S.

DETAILED DESCRIPTION OF THE INVENTION

Described herein are poly(arylene sulfide) ("PAS") polymers (PASP) including recurring units formed from a dihalocarbazole containing monomer. It was surprisingly found that such monomers could be incorporated into PAS polymers at desirable concentrations to provide improved amine content while maintaining a high molecular weight. Additionally, it was surprisingly found that, relative to PAS homopolymers and PAS polymers incorporating recurring units with primary amines, the PAS polymers (PASP) described herein have increased glass transition temperatures ("$T_g$"). The PAS polymers (PASP), and PAS polymer compositions, can be desirably incorporated into wide variety of articles including, but not limited to, automotive articles, aerospace articles, aeronautics articles and oil and gas articles.

As noted above, it was surprisingly found that dihalocarbazole containing monomers can be incorporated into PAS polymers at desirable concentrations to provide improved amine content while maintaining a high molecular weight. Traditional methods of introducing amine content into a PAS polymer involve copolymerization with dichloroaniline ("DCA") (e.g. 3,5-DCA). However, it was surprisingly discovered, as demonstrated in the Examples below, that at relatively low comonomer concentrations, high molecular weight PAS polymer could not be formed using the 3,5-DCA. Furthermore, it was also surprisingly discovered that for PAS polymers with desirable dihalocarbazole comonomer concentrations, high molecular weight PAS polymers is obtained only when the dihalocarbazole containing monomers has the halogens in the 2,7-positions.

As used herein, "free of" a given recurring unit means that the concentration of the given recurring unit in the PAS polymer (PASP) is less than 1 mol %, preferably less than 0.5 mol %, more preferably less than 0.1 mol %, still more prefereably less than 0.01 mol %, even more preferably less than 0.001 mol %, and most preferably, 0 mol % (undetectable).

In the present application, any description, even though described in relation to a specific embodiment, is applicable to and interchangeable with other embodiments of the present disclosure. Furthermore, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list. Additionally, any recitation herein of numerical ranges by endpoints includes all numbers subsumed within the recited ranges as well as the endpoints of the range and equivalents.

Unless specifically limited otherwise, the term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1-dimethylethyl, and cyclo-propyl. Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

The term "aryl" refers to a phenyl, indanyl or naphthyl group. The aryl group may comprise one or more alkyl groups, and are called sometimes in this case "alkylaryl"; for example may be composed of an aromatic group and two $C_1$-$C_6$ groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied.

The PAS Polymer (PASP)

The PAS polymer (PASP) includes recurring unit ($R_{PAS1}$) and recurring unit ($R_{PAS2}$) represented by the following formulae, respectively:

$$[-Ar_1-S-], \text{ and} \quad (1)$$

$$[-Ar_2-S-]. \quad (2)$$

—$Ar_1$— is represented by a formula selected from the following group of formulae:

(3)

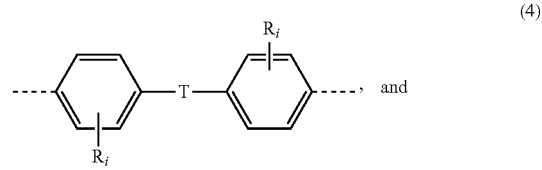

(4)

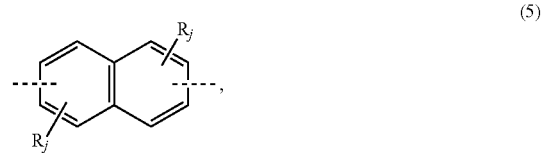

(5)

where R, at each instance, is independently selected from the group consisting of a $C_1$-$C_{12}$ alkyl group, a $C_7$-$C_{24}$ alkylaryl group, a $C_7$-$C_{24}$ aralkyl group, a $C_6$-$C_{24}$ arylene group, and a $C_6$-$C_{18}$ aryloxy group; T is selected from the group consisting of a bond, —CO—, —SO$_2$—, —O—, —C(CH$_3$)$_2$, phenyl and —CH$_2$—; i, at each instance, is an independently selected integer from 0 to 4; and j, at each instance, is an independently selected integer from 0 to 3. For clarity, each benzyl ring in the formulae above have 4-i hydrogens (Formulae (3) and (4)) or 3-j hydrogens (Formula (5)). Accordingly, when i or j is zero, the corresponding benzyl rings are unsubstituted. Similar notation is used throughout the present description. Additionally, each formula (3) to (5) contains two dashed bonds, where one bond is to the explicit sulfur atom in the recurring unit ($R_{PAS1}$) and the other is a bond to an atom outside the recurring unit ($R_{PAS1}$) (e.g. an adjacent recurring unit). Analogous notation is used throughout.

In preferred embodiments, i and j, at each instance, is zero. Preferably, —$Ar_1$— is represented by either Formula (3) or (4), more preferably Formula (3) ([—$Ar_1$—S—] corresponding to recurring units of polyphenylene sulfide), still more preferably, —$Ar_1$— is represented by the following formula:

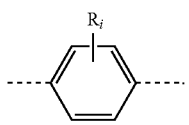

(6)

Most preferably, —$Ar_1$— is represented by Formula (6), where i is zero.

—$Ar_2$— is represented by either one of the following formulae:

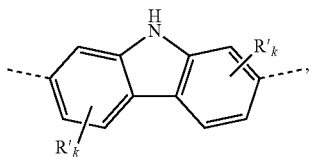

and (7)
where R', at each instance, is independently selected from the group consisting of a $C_1$-$C_{12}$ alkyl group, a $C_7$-$C_{24}$ alkylaryl group, a $C_7$-$C_{24}$ aralkyl group, a $C_6$-$C_{24}$ arylene group, and a $C_6$-$C_{18}$ aryloxy group; and k, at each instance, is an independently selected integer from 0 to 3. Preferably, k, at each instance, is zero (e.g. —$Ar_2$— is formed from a 2,7-dihalocarbazole).

In some embodiments, the total concentration of recurring units ($R_{PAS1}$) and ($R_{PAS2}$) in the PAS polymer is at least 50 mol %, at least 60 mol %, at least 70 mol %, at least 80 mol %, at least 90 mol %, at least 95 mol %, at least 98 mol %, at least 99 mol % or at least 99.9 mol %. As used herein, the molar concentration of recurring units in a polymer is relative to the total number of recurring units in that polymer, unless explicitly stated otherwise. In some embodiments, the concentration of recurring unit ($R_{PAS1}$) is at least 50 mol %, at least 60 mol %, at least 70 mol %, at least 80 mol %, at least 85 mol %, at least 88 mol %, at least 90 mol %, at least 95 mol %, at least 97 mol %, at least 98 mol %, at least 98.5 mol %, or at least 99 mol %.

In some embodiments, the concentration of recurring unit ($R_{PAS2}$) is at least 0.5 mol %, at least 1 mol %, at least 1.5 mol %, at least 2 mol % or at least 2.5 mol %. In some embodiments, the concentration of recurring unit ($R_{PAS2}$) is no more than 15 mol %, no more than 12 mol %, no more than 10 mol %, or no more than 8 mol %. In some embodiments, the number of moles of recurring unit ($R_{PAS2}$) is from 0.5 mol % to 15 mol %, from 0.5 mol % to 12 mol %, from 0.5 mol % to 10 mol %, from 0.5 mol % to 8 mol %, from 1 mol % to 15 mol %, from 1 mol % to 12 mol %, from 1 mol % to 10 mol %, from 1 mol % to 8 mol %, from 2 mol % to 8 mol % or from 2.5 mol % to 8 mol %. In some embodiments, the ratio of the number of recurring unit ($R_{PAS2}$) to the total number of recurring units ($R_{PAS1}$) and ($R_{PAS2}$) is at least 1 mol %, at least 1.5 mol %, at least 2 mol % or at least 2.5 mol %. In some embodiments, the ratio of the number of recurring unit ($R_{PAS2}$) to the total number of recurring units ($R_{PAS1}$) and ($R_{PAS2}$) is no more than 15 mol %, no more than 12 mol %, no more than 10 mol %, or no more than 8 mol %. In some embodiments, the ratio of the number of recurring unit ($R_{PAS2}$) to the total number of moles of recurring units ($R_{PAS1}$) and ($R_{PAS2}$) is from 1 mol % to 15 mol %, from 1 mol % to 12 mol %, from 1 mol % to 10 mol %, from 1 mol % to 8 mol %, from 2 mol % to 8 mol % or from 2.5 mol % to 8 mol %. Nevertheless, in some embodiments, the PAS polymer (PASP) has higher concentrations of recurring unit ($R_{PAS2}$). In some such embodiments, the concentration of recurring unit ($R_{PAS2}$) is from 0.5 mol % to no more than 99 mol %, no more than 80 mol %, no more than 70 mol %, no more than 60 mol %, no more than 50 mol %, no more than 40 mol %, no more than 30 mol % or no more than 20 mol %.

Of course, in some embodiments, the PAS polymer can have additional recurring units, each distinct from each other and distinct from recurring units ($R_{PAS1}$) and ($R_{PAS2}$). In one such embodiment, the PAS polymer includes one or more additional recurring units according to Formula (1) or one or more additional recurring units according to Formula (2). In some embodiments including additional recurring units according to Formulae (1) and (2), the total concentration of recurring units according to Formulae (1) and (2) is within the ranges given above for recurring units ($R_{PAS1}$) and ($R_{PAS2}$), and the ratio of the total number of recurring units according to Formula (1) to the total number of recurring units according to Formulae (1) and (2) are within the ranges above given for recurring units ($R_{PAS1}$) and ($R_{PAS2}$). Of course in other embodiments, the concentration of the additional recurring units according to Formulae (1) and (2), as well as the number of additional recurring units according to Formula (1) to the total number of recurring units according to Formulae (1) and (2), is distinct from the ranges above given for recurring units ($R_{PAS1}$) and ($R_{PAS2}$).

In some embodiments, the PAS polymer has a weight average molecular weight ("$M_w$") of at least 10,000 g/mol, at least 20,000 g/mol, at least 25,000 g/mol, at least 30,000 g/mol, or at least 35,000 g/mol. In some embodiments, the PAS polymer has an $M_w$ of no more than 150,000 g/mol, no more than 100,000 g/mol, no more than 90,000 g/mol, no more than 85,000 g/mol, or no more than 80,000 g/mol. In some embodiments, the PAS polymer has an $M_w$ of from 10,000 g/mol to 150,000 g/mol, from 20,000 g/mol to 100,000 g/mol, from 25,000 g/mol to 90,000 g/mol, from 30,000 g/mol to 85,000 g/mol, or from 35,000 g/mol to 80,000 g/mol. $M_w$ can be measured as described in the Examples below.

The PAS polymer can be amorphous or semi-crystalline. As used herein, an amorphous polymer has an enthalpy of fusion ("$\Delta H_f$") of no more than 5 Joules/g ("J/g"). The person of ordinary skill in the art will recognize that when the PAS is amorphous, it lacks a detectable $T_m$. Accordingly, where a PAS polymer has a Tm, the person of ordinary skill in the art will recognize that it refers to semi-crystalline polymer. Preferably, the PAS polymer is semi-crystalline. In some embodiments, the PAS polymer has a $\Delta H_f$ of at least 10 J/g, at least 20 J/g, at least, or at least 25 J/g. In some embodiments, the PAS polymer has a $\Delta H_f$ of no more than 90 J/g, no more than 70 J/g or no more than 60 J/g. In some embodiments, the PAS polymer has a $\Delta H_f$ of from 10 J/g to 90 J/g or from 20 J/g to 70 J/g. $\Delta H_f$ can be measured as described in the Examples below.

In some embodiments, the PAS polymer has a $T_g$ of at least 95° C. or at least 99° C. In some embodiments, the PAS polymer has a $T_g$ of no more than 200° C. or no more than 150° C. In some embodiments, the PAS polymer has a $T_g$ of from 95° C. to 200° C., from 99° C. to 150° C., from 95° C. to 200° C., or from 99° C. to 150° C. In some embodiments, the PAS polymer has a melting temperature ("$T_m$") of at least 200° C., at least 220° C., at least 240° C., or at least 250° C. In some embodiments, the PAS polymer has a $T_m$ of no more 350° C., no more than 320° C., no more than 300° C., or no more than 285° C. In some embodiments, the PAS polymer has a $T_m$ of from 200° C. to 350° C., from 220° C. to 320° C., from 240° C. to 300° C., or from 250° C. to 285° C. In some embodiments, the PAS polymer has a crystallization temperature ("$T_c$") of at least 140° C. or at least 150° C. In some embodiments, the PAS polymer has a $T_c$ of no more than 250° C., or no more than 220° C. In some embodiments, the PAS polymer has a $T_c$ of from 140° C. to 250° C. or from 150° C. to 220° C. $T_g$, $T_m$ and $T_c$ can be measured as described in the Examples below. In some embodiments, the PAS polymer (PASP) is amorphous and it has a Tg of at least 90° C., at least 95° C., or at least 100° C.

In some embodiments, the PAS polymer (PASP) has an impact strength of at least 30 Joules per gram ("J/g"), or at least 35 J/g. In some embodiments, the PAS polymer (PASP) has an impact strength of no more than 150 J/g or no more than 125 J/g. In some embodiments, the PAS polymer has an impact strength of from 30 J/g to 150 J/g, from 35 J/g to 150 J/g, from 30 J/g to 125 J/g, from 35 J/g to 125 J/g. Unless explicitly stated otherwise, as used herein, impact strength refers to notched-Izod impact strength, measured as described in the Examples below.

Synthesis of the PAS Polymer

The PAS polymer (PASP) can be synthesized by methods known in the art. In one approach, the PAS polymer synthesis includes a polymerization process and a subsequent recovery process. The polymerization process includes a polymerization reaction, in which a dihaloaromatic monomer, a dihalocarbazole containing monomer (distinct from the first dihaloaromatic monomer) and a sulfur compound are polymerized in a solvent to form the PAS polymer, and a termination, in which the polymerization reaction is stopped.

The polymerization reaction involves reacting in a reaction mixture a dihaloaromatic compound having the following formula: $X_1$—$Ar_1$—$X_2$; a dihalocarbazole containing monomer having the following formula: $X_3$—$Ar_2$—$X_4$; and a sulfur compound (collectively, "reaction components") in a polymerization solvent according to the following scheme:

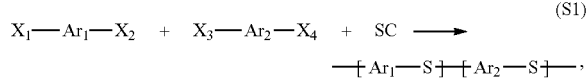
(S1)

where $X_1$ to $X_4$ are independently selected halogens, —$Ar_1$— and —$Ar_2$— are as given above, and SC is a sulfur compound described below. Preferably, $X_1$ and $X_2$ are the same halogen and $X_3$ and $X_4$ are the same halogen. More preferably, $X_1$ and $X_2$ are both chlorine or $X_3$ and $X_4$ are both bromine. In some embodiments, $X_1$ and $X_2$ are both chlorine and $X_3$ and $X_4$ are both bromine. Preferably, $X_1$—$Ar_1$—$X_2$ is a para-dihalobenze, most preferably para-dichlorobenzene. Preferably, $X_3$—$Ar_2$—$X_4$ is 2,7-dibromocarbazole. The person of ordinary skill in the art will recognize that —$Ar_1$— and —$Ar_2$— in reaction scheme (S1) are incorporated into recurring units ($R_{PAS1}$) and ($R_{PAS2}$), respectively, as described in detail above and shown in reaction scheme (S1). Accordingly, the preferences and embodiments for —$Ar_1$— and —$Ar_2$— described above for recurring units ($R_{PAS1}$) and ($R_{PAS2}$) are also applicable for —$Ar_1$— and —$Ar_2$— in reaction scheme (S1). For example, in some embodiments, $X_3$—$Ar_2$—$X_4$ is a 2,7-dihalocarbazole (k, at each instance, is zero). In some embodiments, the reaction components can further include a molecular weight modifying agent.

The sulfur compound (SC) is selected from the group consisting of thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, and hydrogen sulfide. Preferably, the sulfur compound is an alkali metal sulfide. In some embodiments, the alkali metal sulfide is generated in situ from an alkali metal hydrosulfide and an alkali metal hydroxide. For example, $Na_2S$ is a particularly desirable alkali metal sulfide. $Na_2S$ can be generated in situ from NaSH and NaOH.

The polymerization solvent is selected such that it is a solvent for reaction components at the reaction temperature (discussed below). In some embodiments, the polymerization solvent is a polar aprotic solvent. Examples of desirable polar aprotic solvents include, but are not limited to, hexamethylphosphoramide, tetramethylurea, n,n-ethylenedipyrrolidone, n-methyl-2-pyrrolidone ("NMP"), pyrrolidone, caprolactam, n-ethylcaprolactam, sulfolane, n,n'-dimethylacetamide, and 1,3-dimethyl-2-imidazolidinone. Preferably, the polymerization solvent is NMP. In embodiments, in which the polymerization solvent includes NMP, NMP can react with NaOH to form n-methyl-1,4-aminobutanoate ("SMAB").

As noted above, in some embodiments, the reaction components further include a molecular weight modifying agent. The molecular weight modifying agent increases the molecular weight of the PAS polymer, relative to a synthesis scheme not including the molecular weight modifying agent. Preferably, the molecular weight modifying agent is an alkali metal carboxylate. Alkali metal carboxylate are represented by the formula: $R'CO_2M'$, where $R'$ is selected from the group consisting of a $C_1$ to $C_{20}$ hydrocarbyl group, a $C_1$ to $C_{20}$ hydrocarbyl group and a $C_1$ to $C_5$ hydrocarbyl group; and M' is selected from the group consisting of lithium, sodium, potassium, rubidium or cesium. Preferably M' is sodium or potassium, most preferably sodium. Preferably, the alkali metal carboxylate is sodium acetate.

The polymerization reaction is performed by contacting the reaction components at a reaction temperature selected such that $X_1$—$Ar_1$—$X_2$, $X_3$—$Ar_2$—$X_4$ and SC polymerize to form the PAS polymer. In some embodiments, the reaction temperature is from 170° C. to 450° C., or from 200° C. to 285° C. The reaction time (time duration of the polymerization reaction) can be from 10 minutes to 3 days or from 1 hour to 8 hours. During the polymerization reaction, the pressure (reaction pressure) is selected to maintain the reaction components in the liquid phase. In some embodiments, the reaction pressure can be from 0 pounds per square inch gauge ("psig") to 400 psig, from 30 psig to 300 psig, or from 100 psig to 250 psig.

The polymerization reaction can be terminated by cooling the reaction mixture to a temperature at which the polymerization reaction ceases. "Reaction mixture" refers to the mixture formed during the polymerization reaction and contains any remaining reaction components, formed PPS polymer and reaction by-products. The cooling can be performed using a variety of techniques known in the art. In some embodiments, the cooling can be done by flashing rapidly the reaction mixture. In some embodiments, the cooling can include liquid quenching. In liquid quenching, a quench liquid is added to the reaction mixture to cool the reaction mixture. In some embodiments, the quench liquid is selected from the group consisting of the polymerization solvent, water and a combination thereof. In some embodiments, the temperature of the quench liquid can be from about 15° C. to 99° C. In some embodiments, the temperature of the quench liquid can be from 54° C. to 100° C. (e.g. in embodiments in which the quench liquid is the solvent) or from 15° C. to 32° C. (e.g. in embodiments in which the quench liquid is water). The cooling can be further facilitated by use of a reactor jacket or coil, to cool the reaction vessel in which the polymerization reaction is performed ("polymerization reactor"). For clarity, termination of the polymerization reaction does not imply that complete reaction of the reaction components. Generally, termination is initiated at a time when the polymerization reaction is substantially complete or reaches the targeted yield or when further reaction of the reaction components would not result in a significant increase in average molecular weight of the PAS polymer.

After termination, the PAS polymer is present as a PAS polymer mixture. The PAS polymer mixture includes water, the polymerization solvent, reaction by-products including salts (e.g. sodium chloride and sodium acetate); PAS oligomers, and any unreacted reaction components (collectively, "post-reaction compounds"). Generally, after termination, the PAS polymer mixture is present as a slurry, having a liquid phase and a solid phase containing the PAS polymer (precipitates from the solvent during liquid quenching or during the flashing). In some embodiments, the PAS polymer mixture can be present as wet PAS polymer, for example, by filtration of the slurry after termination. PAS polymer synthesis, including polymerization and termination, and recovery, including water treatment, acid treatment and metal cation treatment, is discussed in US patent application publication number, 2015/0175748 to Fodor et al., filed Dec. 19, 2013 ("the '748 patent") and incorporated by reference herein in its entirety.

Subsequent to termination, a recovery process is implemented. The recovery process includes one or more washes, where each wash includes contacting the PAS polymer formed during polymerization with a liquid. The liquid of each wash is independently selected from water, aqueous acid, and an aqueous metal cation solution. Examples of post-reaction recovery processes are discussed in the '748 patent. Based upon the disclosure herein, the person of ordinary skill in the art will know how to select a recovery process to obtain the PAS polymer described herein.

Subsequent to the recovery process, the PAS polymer mixture can be dried. The drying can be performed at any temperature which can substantially dry the PAS polymer mixture, to yield a dried PAS polymer. Desirably, the drying process is selected to help prevent oxidative curing of the PAS polymer. For example, if the drying process is conducted at a temperature of at least 100° C., the drying can be conducted in a substantially non-oxidizing atmosphere (e.g., in a substantially oxygen free atmosphere or at a pressure less than atmospheric pressure, for example, under vacuum). When the drying process is conducted at a temperature less than 100° C., the drying process can be facilitated by performing the drying at a pressure less than atmospheric pressure so the liquid component can be vaporized from the PAS polymer mixture. When the drying is performed at a temperature of less than 100° C., the presence of a gaseous oxidizing atmosphere (e.g. air) generally does not result in a detectable curing of the PAS polymer.

PAS Polymer Compositions

The polymer composition (PC) includes the PAS polymer and at least one other component selected from the group consisting of selected from the group consisting of additional polymers, thermoset precursors (e.g. epoxy resins), harderners (e.g. aliphatic, cycloaliphatic and aromatic monoamines and polyamines), reinforcing agents, tougheners, plasticizers, colorants, pigments, antistatic agents, dyes, lubricants, thermal stabilizers, light stabilizers, flame retardants (including, but not limited to, halogen free flame retardants), nucleating agents and antioxidants.

In some embodiments, the concentration of the PAS polymer in the polymer composition (PC) is at least 1 wt. %, at least 5 wt. %, at least 10 wt. % by weight, at least 20 wt. % or at least 40 wt. %. In some embodiments, the concentration of the PAS polymer in the polymer composition (PC) is no more than 99.95 wt. %, no more than 99 wt. %, no more than 95 wt. %, no more than 90 wt. %, no more than 85 wt. %, no more than 80 wt. %, no more than 70 wt. % or no more than 60 wt. %. In some embodiments, the concentration of the PAS polymer in the polymer composition (PC) is from 20 wt. % to 99.95 wt. %, from 20 wt. % to 95 wt. %, from 20 wt. % to 85 wt %, from 20 wt. % to 80 wt. %, from 20 wt. % to 70 wt. %, or from 20 wt. % to 60 wt. %. As used herein, the concentration of a component in the polymer composition is relative to the total weight of the polymer composition (PC), unless explicitly stated otherwise.

As noted above, the PAS polymer (PASP) can be desirably incorporated into polymer blends, in which the polymer compositions (PC) includes the PAS polymer (PASP) and an additional polymer as described below. The pendant amine of the PAS polymer (PASP) (from the dihalocarbazole containing monomer) can react with a wide variety of functional groups including, but not limited to, a carboxylic acid, a carboxylate, an anhydride, an epoxide, a urethane, an amide, a ketone, an isocyanate, a urea, a halogen, an activated ether, an ester, and an acid chloride. In some embodiments, the polymer composition (PC) can include the PAS polymer (PASP) and an additional polymer containing functional group selected from the group consisting of carboxylic acids, carboxylates, anhydrides, epoxides, urethanes, amides, ketones, isocyanates, urea, halogens, activated ethers, esters, and an acid chlorides. The functional group can be present at the chain ends of the polymer or on the backbone of the polymer (i.e. in recurring units not terminating the polymer chain). In some embodiments, the additional polymer is a thermoplastic polymer. In some such embodiments, the additional polymer is selected from the group consisting of a poly(aryl ether sulfone), a polyamide, a polyamideimide, a liquid crystal polymer, a polyimide, a polyetherimide, a poly(aryl ether ketone), a polyurethane, a polyesters, and a polycarbonate. In some embodiments, the additional polymer is a thermoset polymer or thermoset precursor. In some such embodiments, the additional polymer is selected from the group consisting of an epoxy resin, an epoxy novolac resin, a benzoxazine, a bismaleimide, a polyacid amic solutions, a polyester thermosetting resin, a vinyl ester, a cyanate ester, and a urea-formaldehyde resin. Of course, in some embodiments, the polymer composition (PC) can include a plurality of additional polymers as described above, which can be all thermoplastic polymers, all thermoset polymers, or a mixture thereof.

In some embodiments, the polymer composition (PC) further includes a reinforcing agent (also called reinforcing fibers or fillers). They can be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50. In some embodiments, the reinforcing fibers (e.g. glass fibers or carbon fibers) have an average length of from 3 mm to 50 mm. In some such embodiments, the reinforcing fibers have an average length of from 3 mm to 10 mm, from 3 mm to 8 mm, from 3 mm to 6 mm, or from 3 mm to 5 mm. In alternative embodiments, the reinforcing fibers have an average length of from 10 mm to 50 mm, from 10 mm to 45 mm, from 10 mm to 35 mm, from 10 mm to 30 mm, from 10 mm to 25 mm or from 15 mm to 25 mm. The average length of the reinforcing fibers can be taken as the average length of the reinforcing fibers prior to incorporation into the polymer composition (PC) or can be taken as the average length of the reinforcing fiber in the polymer composition (PC). In the case of glass fibers, they can be round (circular cross section) or flat (non-circular cross-section including, but not limited to, oval, elliptical or rectangular).

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

In some embodiments, the concentration of the reinforcing agent (e.g. glass or carbon fibers) in the polymer composition (PC) is at least 5 wt. %, at least 10 wt. %, at least 15 wt. % or at least 20 wt. %. In some embodiments, the concentration of the reinforcing agent in the polymer composition (PC) is no more 70 wt. %, no more than 65 wt. % or no more than 60 wt. %. In some embodiments, concentration of the reinforcing agent in the polymer composition (PC) is from 5 wt. % to 70 wt. %, from 10 wt. % to 70 wt. %, from 10 wt. % to 65 wt. %, from 10 wt. % to 60 wt. %, from 15 wt. % to 60 wt. %, or from 20 wt. % to 60 wt. %.

In some embodiments, the polymer composition (PC) further includes a flame retardant. The flame retardant can be a halogen-free flame retardant or a halogenated flame retardant. Preferably, the flame retardant is a halogen-free flame retardant. Halogen-free flame retardants include, but are not limited to, organophosphorous compounds selected from the group consisting of phosphinic salts ("phosphinates"), diphosphinic salts ("diphosphinates") and condensation products thereof. Phosphinates are preferred organophosphorous compound. Suitable phosphinates include, but are not limited to, those described in U.S. Pat. No. 6,365,071 to Jenewein et al., issued on Apr. 2, 2002 and incorporated herein by reference. Particularly preferred phosphinates are aluminum phosphinates, calcium phosphinates, and zinc phosphinates. Among aluminum phosphinates, aluminium ethylmethylphosphinate and aluminium diethylphosphinate and combinations thereof are preferred. Halogenated flame retardants include, but are not limited to, 1,2-bis(tribromophenoxy)ethane, brominated epoxy oligomers, brominated polystyrene, chlorendic anhydride, chlorinated paraffins, decabromobiphenyl, decabromodiphenylethane, decabromodiphenyloxide, dechlorane plus, dibromoneopentylglycol, ethylene-bis(5,6-dibromonorbornane-2,30dicarboximide), ethylene-bis(tetrabromophthalimide), halogenated polyetherpolyols, hexabromocyclododecane, octabromodiphenyloxide, octabromotrimethylphenylindane, pentabromodiphenyloxide, poly(dibromostyrene), poly(pentabromobenzylacrylate), tetrabromo-bisphenol-A, tetrabromo-bisphenol-A, bis(2,3-dibromopropyl ether), tetrabromophthalate diols and tetrabromophthalic anhydride. Preferably, the halogenated flame retardant is a brominated or chlorinated compound or polymer.

In some embodiments, the concentration of the flame retardant in the polymer composition (PC) is at least 1 wt. %, at least 3 wt. %, or at least 5 wt. %. In some embodiments, the concentration of the flame retardant in the polymer composition (PC) is no more than 30 wt. %, no more than 25 wt. %, or no more than 20 wt. %. In some embodiments, the concentration of the flame retardant in the polymer composition (PC) is from 1 wt. % to 30 wt. %, from 3 wt. % to 25 wt. %, or from 5 wt. % to 20 wt. %.

The polymer composition (PC) may also include a toughener. A toughener is generally a low $T_g$ polymer, with a $T_g$ for example below room temperature, below 0° C. or even below −25° C. As a result of its low $T_g$, the toughener are typically elastomeric at room temperature. Tougheners can be functionalized polymer backbones.

The polymer backbone of the toughener can be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

When the toughener is functionalized, the functionalization of the backbone can result from the copolymerization of monomers which include the functionalization or from the grafting of the polymer backbone with a further component.

Specific examples of functionalized tougheners are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride; ABS copolymers grafted with maleic anhydride. Further specific examples of functionalized tougheners also include copolymers of ethylene and glycidyl methacrylate as well as copolymers of ethylene and methacrylic acid.

The toughener may be present in the composition (C) in a total amount of greater than 1 wt. %, greater than 2 wt. % or greater than 3 wt. %, based on the total weight of the composition (C). The toughener may be present in the composition (C) in a total amount of less than 30 wt. %, less than 20 wt. %, less than 15 wt. % or less than 10 wt. %, based on the total weight of the polymer composition (PC).

The composition (C) may also comprise other conventional additives commonly used in the art, including plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

In some embodiments, the polymer composition (PC) consists essentially of the PAS polymer (PASP) and a glass fiber. In some embodiments, the polymer composition (PC) consists essentially of the PAS polymer (PASP) and a toughener. In some embodiments, the polymer composition (PC) consists essentially of the PAS polymer (PASP), glass fiber and a toughener. As used herein with respect to the polymer composition (PC), consists essentially of indicates that the concentration of components other than the explicitly recited components is less than 5 wt. %, less than 2 wt. %, less than 1 wt. %, less than 0.5 wt. %, less than 0.1 wt. %, less than 0.05 wt. %, or less than 0.01 wt. %.

The polymer composition (PC) may also comprise one or more additional polymers, preferably additional PAS polymers (PASP). For example, in some embodiments, the polymer composition (PC) can include a plurality of PAS polymers (PASP), each distinct from each other and each comprising recurring units ($R_{PAS1}$), ($R_{PAS2}$), or a combination thereof.

In some embodiments, the polymer composition (PC) includes the PAS polymer (PASP) and from 10 wt. % to 60 wt. % of a glass fiber (it may, of course, including other components such as a toughener). In some such embodiments, the concentration of the PAS polymer (PASP) in the polymer composition (PC) is from 20 wt. % to 90 wt. %. In some embodiments, the polymer composition (PC) includes the PAS polymer (PASP) and from 5 wt. % to 30 wt. % of a toughener. In some such embodiments, the concentration of the PAS polymer (PASP) in the polymer composition (PC) is from 70 wt. % to 95 wt. %.

Preparation of the Polymer Composition (PC)

The polymer compositions (PC) can be made using methods well known in the art. In one approached, the polymer compositions (PC) can be made by melt-blending the PAS polymer and the specific components (e.g. a reinforcing filler, a flame retardant, a stabilizer, and of any other components).

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

When the polymer composition (PC) contains a thermoset polymer or thermoset precursors, as described in detail above, the PAS polymer ("PASP"), in the form of powder (characterized by a D50 from 1 micron to 500 microns, preferably from 2 microns to 200 microns, and most preferably from 5 microns to 100 micron), can be blended with the thermoset polymer or thermoset precursor, along with any other additives using any equipment known in the prior art to disperse additives in thermoset precursors.

Articles and Applications

The PAS polymer and polymer composition (PC) can be desirably incorporated into articles.

The article can notably be used in mobile electronics, LED packaging, oil and gas components, food contact components (including, but not limited to, food film and casing), electrical and electronic components (including, but not limited to, power unit components for computing, data-system and office equipment and surface mounted technology compatible connectors and contacts), medical device components, construction components (including, but not limited to, pipes, connectors, manifolds and valves, for cooling and heating systems; boiler and meter components; gas systems pipes and fittings; and electrical protection devices for mini-circuit breakers, contactors, switches and sockets), industrial components, plumbing components (including, but not limited to, pipes, valves, fittings, manifolds, shower taps and shower valves), automotive components, and aerospace components (including, but not limited to, interior cabin components).

The article can be, for example, a mobile electronic device component. As used herein, a "mobile electronic device" refers to an electronic device that is intended to be conveniently transported and used in various locations. A mobile electronic device can include, but is not limited to, a mobile phone, a personal digital assistant ("PDA"), a laptop computer, a tablet computer, a wearable computing device (e.g., a smart watch, smart glasses and the like), a camera, a portable audio player, a portable radio, global position system receivers, and portable game consoles. The mobile electronic device component may include, for example, a radio antenna and the composition (C). In this case, the radio antenna can be a WiFi antenna or an RFID antenna. The mobile electronic device component may also be an antenna housing.

In some embodiments, the mobile electronic device component is an antenna housing. In some such embodiments, at least a portion of the radio antenna is disposed on the polymer composition (PC). Additionally or alternatively, at least a portion of the radio antenna can be displaced from the polymer composition (PC). In some embodiments, the device component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

Examples of electric and electronics devices include, but are not limited to, connectors, contactors, switches, flexible and non-flexible printed circuit boards.

Examples of oil and gas components include, but are not limited to, compressor rings, poppets, back-up seal rings, electrical connectors, labyrinth seals, motor end plates, bearings, bushings, suck rod guides and down hole tubing.

Examples of automotive components include, but are not limited to, components in thermal management systems (including, but not limited to, thermostat housings, water inlet/outlet valves, water pumps, water pump impellers, and heater cores and end caps), air management system components (including, but not limited to, turbocharger actuators, turbocharger by-pass valves, turbocharger hoses, EGR valves, CAC housings, exhaust gas recirculation systems, electronic controlled throttle valves, and hot air ducts), transmission components and launch device components (including, but not limited to, dual clutch transmissions, automated manual transmissions, continuously variable transmissions, automatic transmissions, torque convertors, dual mass flywheels, power takeoffs, clutch cylinders, seal rings, thrust washers, thrust bearings, needle bearings, and check balls), automotive electronic components, automotive lighting components (including, but not limited to, motor end caps, sensors, ECU housings, bobbins and solenoids, connectors, circuit protection/relays, actuator housings, Li-Ion battery systems, and fuse boxes), traction motor and power electronic components (including, but not limited to, battery packs), fuel and selective catalytic reduction ("SCR") systems (including, but not limited to, SCR module housings and connectors, SCR module housings and connectors, fuel flanges, rollover valves, quick connects, filter housings, fuel rails, fuel delivery modules, fuel hoses, fuel pumps, fuel injector o-rings, and fuel hoses), fluid system components (e.g. fuels system components) (including, but not limited to inlet and outlet valves and fluid pump components), interior components (e.g. dashboard components, display components, and seating components), and structural and lightweighting components (e.g. gears and bearings, sunroofs, brackets and mounts, electrical battery housings, thermal management components, braking system elements, and pump and EGR systems).

The article can be molded from the PAS polymer (PASP) or polymer composition (PC) by any process adapted to thermoplastics, e.g. extrusion, injection molding, blow molding, rotomolding or compression molding.

The article can be printed from the PAS polymer (PASP) or polymer composition (PC) by a process comprising a step of extrusion of the material, which is for example in the form of a filament, or comprising a step of laser sintering of the material, which is in this case in the form of a powder.

In some embodiments, the PAS polymer (PASP) or polymer composition (PC) can be desirably incorporated into three dimensional printing applications. One application is direct to a method for manufacturing a three-dimensional ("3D") object with an additive manufacturing system, comprising providing a part material comprising the PAS polymer (PASP) or polymer composition (PC) of the present invention, and printing layers of the three-dimensional object from the part material.

The PAS polymer (PASP) or polymer composition (PC) can therefore be in the form of a thread or a filament to be used in a process of 3D printing, e.g. Fused Filament Fabrication, also known as Fused Deposition Modelling ("FDM").

The PAS polymer (PASP) or polymer composition (PC) can also be in the form of a powder, for example a substantially spherical powder, to be used in a process of 3D printing, e.g. Selective Laser Sintering (SLS).

The PAS polymer (PASP) or polymer composition (PC) can be incorporated into a composite. A composite includes continuous reinforcing fibers imbedded in a thermoplastic matrix. In some embodiments, the continuous reinforcing fiber is selected from glass fiber, carbon fibers, aluminum fiber, titanium fiber, magnesium fiber, boron carbide fibers, rock wool fiber, steel fiber, aramid fiber, natural fiber (e.g. cotton, linen and wood) and any combination of one or more, thereof. Preferably, the continuous reinforcing fiber is glass fiber or carbon fiber. As used herein, continuous reinforcing fibers are reinforcing fibers that have an average length in the longest dimension of at least 5 millimeters ("mm"), at least 10 mm, at least 25 mm or at least 50 mm. The thermoplastic matrix includes the PAS polymer (PASP) or polymer composition (PC). The composite can be a unidirectional composite (e.g. a tape) or a multidirectional composite (e.g. a woven fabric, a mat, or a layered fabric).

The present invention relates to the use of the PAS polymers (PASP) and polymer compositions (PC) or articles for manufacturing the articles as described above. The present invention also relates to the use of the above-described PAS polymers (PASP) or polymer compositions (C) for 3D printing an object.

EXAMPLES

The present examples demonstrate the synthesis and the thermal and impact performance of the PAS polymers described herein.

Raw Materials 1-methyl-2-pyrollidone ("NMP") (>99.0%): obtained from TCI
sodium hydrosulfide ("NaSH") (55-60 wt. %): obtained from AkzoNobel
1,4-dichlorobenzene ("DCB") (≥99): obtained from Alfa Aesar
sodium hydroxide (≥97.0%): obtained from Fisher Chemical
sodium acetate (≥99%): obtained from VWR Chemicals
3,5-dichloroaniline ("3,5-DCA") (≥98%): obtained from Alfa Aesar
3,6-dibromocarbazole ("3,6-DBC") (≥98.0%): obtained from TCI
2,7-dibromocarbazole ("2,7-DBC") (≥97%): obtained from AccelaChemBio Synthesis of PAS Polymers Example 1: (2.5 mol % 2,7-DBC co-PPS) A 1-L autoclave reactor was charged with 31.25 g sodium hydroxide (0.781 mol), 20.74 g sodium acetate (0.253 mol), 74.05 g NaSH (58.00 wt %, 0.766 mol), 6.22 g 2,7-DBC (0.019 mol), and 205 mL NMP. The reactor was purged and pressurized to 10 psig with nitrogen and set to stir continuously at 400 rpm. A separate addition vessel was charged with 109.80 g DCB (0.747 mol) and 50 g NMP. The addition vessel was purged and pressurized to 90 psig with nitrogen, and heated to 100° C. The reactor was heated to 240° C. at 1.5° C./min. Upon reaching 150° C., the reactor was vented through a condenser and ~40 mL of a clear condensate was collected under a small stream of nitrogen (60 mL/min) until the reactor reached 200° C. At this point, the condenser was removed, the nitrogen flow was stopped, and the DCB/NMP mixture in the addition vessel was promptly added to the reactor. The addition vessel was charged with an additional 30 mL NMP, purged and pressurized to 90 psig with nitrogen, and the contents were immediately added to the reactor. The sealed reactor was held at 240° C. for 2 hours, heated to 265° C. at 1.5° C./min, held at 265° C. for 2 hours, cooled to 200° C. at 1.0° C./min, and finally allowed to cool to room temperature. The resulting slurry was diluted with 200 mL NMP, removed from the reactor, heated to 80° C., and filtered through a medium porosity sintered glass filter. The filter cake was washed once with 100 mL warm NMP (60° C.). The solids were stirred for 15 minutes in 300 mL heated DI water (70° C.) and subjected to filtration on the medium porosity glass filter, a process that was repeated five times in total. The rinsed solids were dried in a vacuum oven overnight at 100° C. under nitrogen to give 77.15 g of a white granular solid. GPC, DSC, ASTM Type V Tensile, and ASTM Notched Izod data for this and following examples are given in the Table below.

Example 2: (5 mol % 2,7-DBC co-PPS) Synthesized according to procedure from Example 1 with 31.52 g sodium hydroxide (0.788 mol), 20.92 g sodium acetate (0.255 mol), 74.68 g NaSH (58.00 wt %, 0.773 mol), 12.55 g 2,7-DBC (0.039 mol), 107.89 g DCB (0.734 mol), and 287 mL total NMP. Afforded 83.30 g of a fine, white granular solid.

Example 3: (10 mol % 2,7-DBC co-PPS) Synthesized according to procedure from Example 1 with 31.35 g sodium hydroxide (0.784 mol), 20.80 g sodium acetate (0.254 mol), 72.76 g NaSH (59.21 wt %, 0.768 mol), 24.97 g 2,7-DBC (0.077 mol), 101.66 g DCB (0.692 mol), and 286 mL total NMP. Afforded 82.60 g of a white powder.

Counter Example 1: (PPS homopolymer) Synthesized according to procedure from Example 1 (except that no 2,7-DBC was used) with 45.89 g sodium hydroxide (1.147 mol), 30.45 g sodium acetate (0.371 mol), 106.95 g NaSH (58.96 wt %, 1.125 mol), 165.34 g DCB (1.125 mol), and 418 mL total NMP. Afforded 112.60 g of a granular white solid.

Counter Example 2: (10 mol % 3,5-DCA co-PPS) Synthesized according to procedure from Example 1 (except that 3,5-DCA was used instead of 2,7-DBC) with 37.30 g sodium hydroxide (0.932 mol), 24.75 g sodium acetate (0.302 mol), 86.56 g NaSH (59.21 wt %, 0.914 mol), 14.81 g 3,5-DCA (0.091 mol), 120.95 g DCB (0.823 mol), and 340 mL total NMP. The polymerization resulted in higher than usual maximum pressure (170 psig vs. a typical 150 psig). The reaction mixture was a brown sludge that smelled strongly of thiophenol and other decomposition species. A portion was rinsed according to procedure to afford a light brown powder.

Counter Example 3: (10 mol % 3,6-DBC co-PPS) Synthesized according to procedure from Example 1 (except that 3,6-DBC was used instead of 2,7-DBC) with 31.17 g sodium hydroxide (0.779 mol), 20.69 g sodium acetate (0.252 mol), 72.35 g NaSH (59.21 wt %, 0.764 mol), 24.83 g 3,6-DBC (0.076 mol), 101.09 g DCB (0.688 mol), and 204 mL total NMP. The polymerization resulted in higher than usual maximum pressure (170 psig vs. a typical 150 psig). The reaction mixture was a brown sludge that smelled strongly of thiophenol and other decomposition species. A portion was rinsed according to procedure to afford a light brown powder.

Testing Methods

Thermal Performance: $T_g$, $T_m$, and $\Delta H_f$ were determined using differential scanning calorimetry ("DSC"), according to ASTM D3418 employing a heating and cooling rate of 20° C./min. Three scans were used for each DSC test: a first heat up to 350° C., followed by a first cool down to 30° C., followed by a second heat up to 350° C. $T_g$, $T_m$, and $\Delta H_f$ were determined from the second heat.

Molecular Weight: $M_w$ was determined by gel permeation chromatography (GPC) at 210° C. using a PL 220 high temperature GPC with a 1-chloronaphtalene mobile phase and polystyrene standards.

Impact Performance: Notched Izod values were determined according to ASTM D256 using 0.125 inch flex bars at room temperature.

Thermal and Impact Performance

Testing results are displayed in Table 1. In the tables, "E" denotes an Example and "CE" denotes a counter example.

TABLE 1

| Example | Comonomer (mol %) | $M_w$ (g/mol) | $T_m$ (° C.) | $\Delta H_f$ (J/g) | $T_g$ (° C.) | Notched Izod (J/g) |
|---|---|---|---|---|---|---|
| E1 | 2,7-DBC (2.5) | | 268 | 44 | 104 | 36 |
| E2 | 2,7-DBC (5) | | 256 | 33 | 102 | — |
| E3 | 2,7-DBC (10) | 40,900 | not observed | 0 | 105 | — |
| CE1 | None | 52,100 | 280 | 42 | 98 | 28 |
| CE2 | 3,5-DCA (10) | 4,300 | 240 | 50 | not observed | |
| CE3 | 3,6-DBC (10) | 3,600 | 256 | 44 | not observed | |

Referring to Table 1, comparison of E3 with CE2 demonstrates that the traditional approach to incorporating amine content into PAS polymers does not provide adequate molecular weights at desirable monomer concentrations. For example, CE2, having 10 mol % recurring units formed from 3,5-DCA, had a molecular weight of 4,300 g/mol. On the other hand, E3, having 10 mol % recurring units formed from 2,7-DBC had a molecular weight of 40,900 g/mol, which corresponds to high molecular weight PPS. Similarly comparison of E3 with CE3 demonstrates that high molecular weight PAS polymer can only be obtained when the halogens of the dihalocarbazole containing monomer are in the 2,7-positions. CE3, having 10 mol % recurring units formed from 3,6-DBC, only had a molecular weight of 3,600 g/mol. On the other hand, E3, having 10 mol % recurring units formed from 2,7-DBC had a molecular weight of 40,900 g/mol. Surprisingly, we also observe that the PPS containing only 2.5 mol % of 2,7-DCB of E1 has an improved impact strength vs the PPS homopolymer ("CE1"). With respect to CE2 and CE3, it is noted that $M_w$ was too low to obtain $T_g$ measurements (not observed).

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A poly(arylene sulfide) ("PAS") polymer (PASP) comprising recurring units $R_{PAS1}$ and $R_{PAS2}$, represented by the following formulae, respectively:

[—Ar$_1$—S—], (1)

[—Ar$_2$—S—], (2)

wherein
—Ar$_1$— is selected from the group of formulae-consisting of:

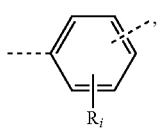 (3)

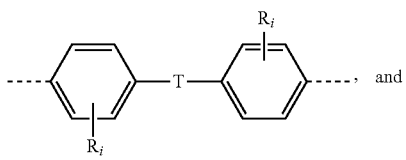 (4)

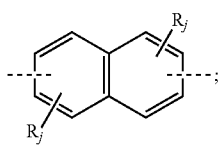 (5)

—Ar$_2$— is represented by the following formula:

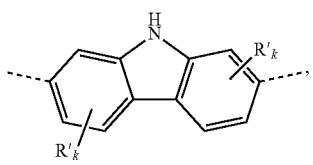 (6)

R and R', at each instance, is independently selected from the group consisting of a $C_1$-$C_{12}$ alkyl group, a $C_7$-$C_{24}$ alkylaryl group, a $C_7$-$C_{24}$ aralkyl group, a $C_6$-$C_{24}$ arylene group, and a $C_6$-$C_{18}$ aryloxy group;
T is selected from the group consisting of a bond, —CO—, —SO$_2$—, —O—, —C(CH$_3$)$_2$, phenyl and —CH$_2$—;
i, at each instance, is an independently selected integer from 0 to 4; and
j and k, at each instance, are an independently selected integer from 0 to 3.

2. The PAS polymer (PASP) of claim 1, wherein —Ar$_1$— is represented by the following formula:

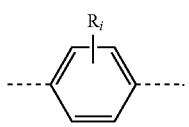 (7)

3. The PAS polymer (PASP) of claim 1, wherein k, at each location, is zero.

4. The PAS polymer (PASP) of claim 1, wherein the ratio of the number of recurring unit ($R_{PAS2}$) to the total number of recurring units ($R_{PAS1}$) and ($R_{PAS2}$) is from 0.5 mol % to 15 mol %.

5. The PAS polymer (PASP) of claim 1, wherein the ratio of the number of recurring unit ($R_{PAS2}$) to the total number of recurring units ($R_{PAS1}$) and ($R_{PAS2}$) is from 0.5 mol % to 8 mol %.

6. The PAS polymer (PASP) of claim 1, comprising a $T_g$ of at least 95° C.

7. The PAS polymer (PASP) of claim 1, comprising a $T_m$ of at least 200° C.

8. The PAS polymer (PASP) of claim 1, comprising an impact strength at least 30 J/g, as determined according to ASTM D256.

9. A polymer composition (PC) comprising the PAS polymer (PASP) of claim 1 and an additional polymer comprising a functional group selected from the group consisting of a carboxylic acid, a carboxylate, an anhydride, an epoxide, a urethane, an amide, a ketone, an isocyanate, a urea, a halogen, an activated ether, an ester, and an acid chloride.

10. The polymer composition (PC) of claim 9, wherein the additional polymer is a thermoplastic polymer.

11. The polymer composition (PC) of claim 9, wherein the additional polymer is a thermoset polymer or thermoset precursor.

12. The polymer composition (PC) of claim 11, wherein the additional polymer is selected from the group consisting of an epoxy resin, an epoxy novolac resin, a benzoxazine, a bismaleimide, polyacid amic solutions, a polyester thermosetting resin, a vinyl ester, a cyanate ester, and a urea-formaldehyde resin.

13. The polymer composition (PC) of claim 10, further comprising fibrous reinforcing filler or a toughener.

14. An automotive component, an aerospace component, or oil and gas component comprising the PAS polymer (PASP) of claim 1.

15. A method of making the PAS polymer (PASP) of claim 1, the method comprising:
reacting in a reaction mixture a dihaloaromatic compound having the following formula:
$X_1$—Ar$_1$—$X_2$; a dihalocarbazole containing monomer having the following formula:
$X_3$—Ar$_2$—$X_4$; and a sulfur compound, wherein
$X_1$ to $X_4$ are independently selected halogens, and
the sulfur compound is selected from the group consisting of thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, and hydrogen sulfide.

16. An automotive component, an aerospace component, or oil and gas component comprising the polymer composition (PC) of claim 9.

17. The method of claim 15, wherein the sulfur compound is an alkali metal sulfide.

18. The method of claim 15, wherein the sulfur compound is Na$_2$S.

* * * * *